Patented Dec. 5, 1922.

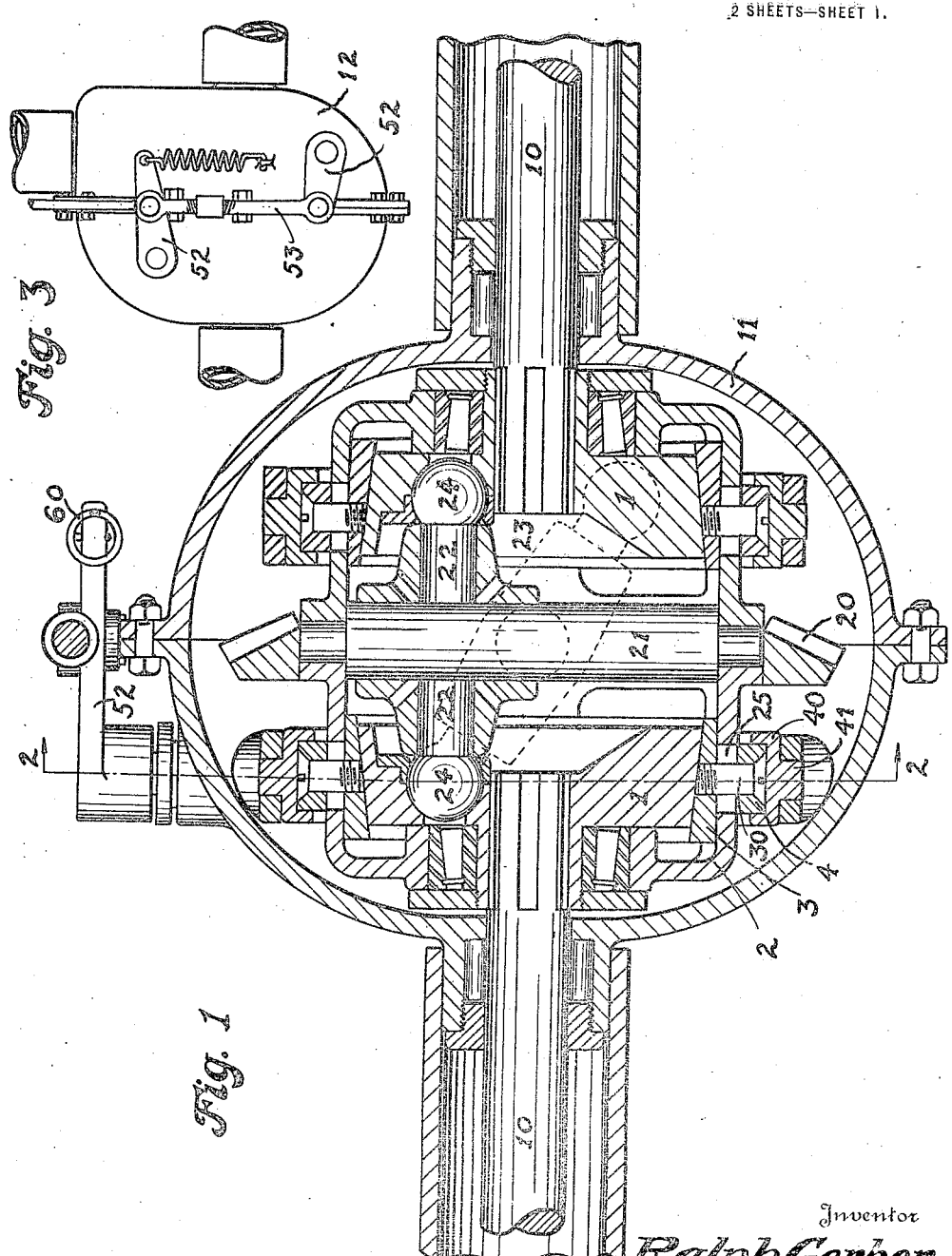

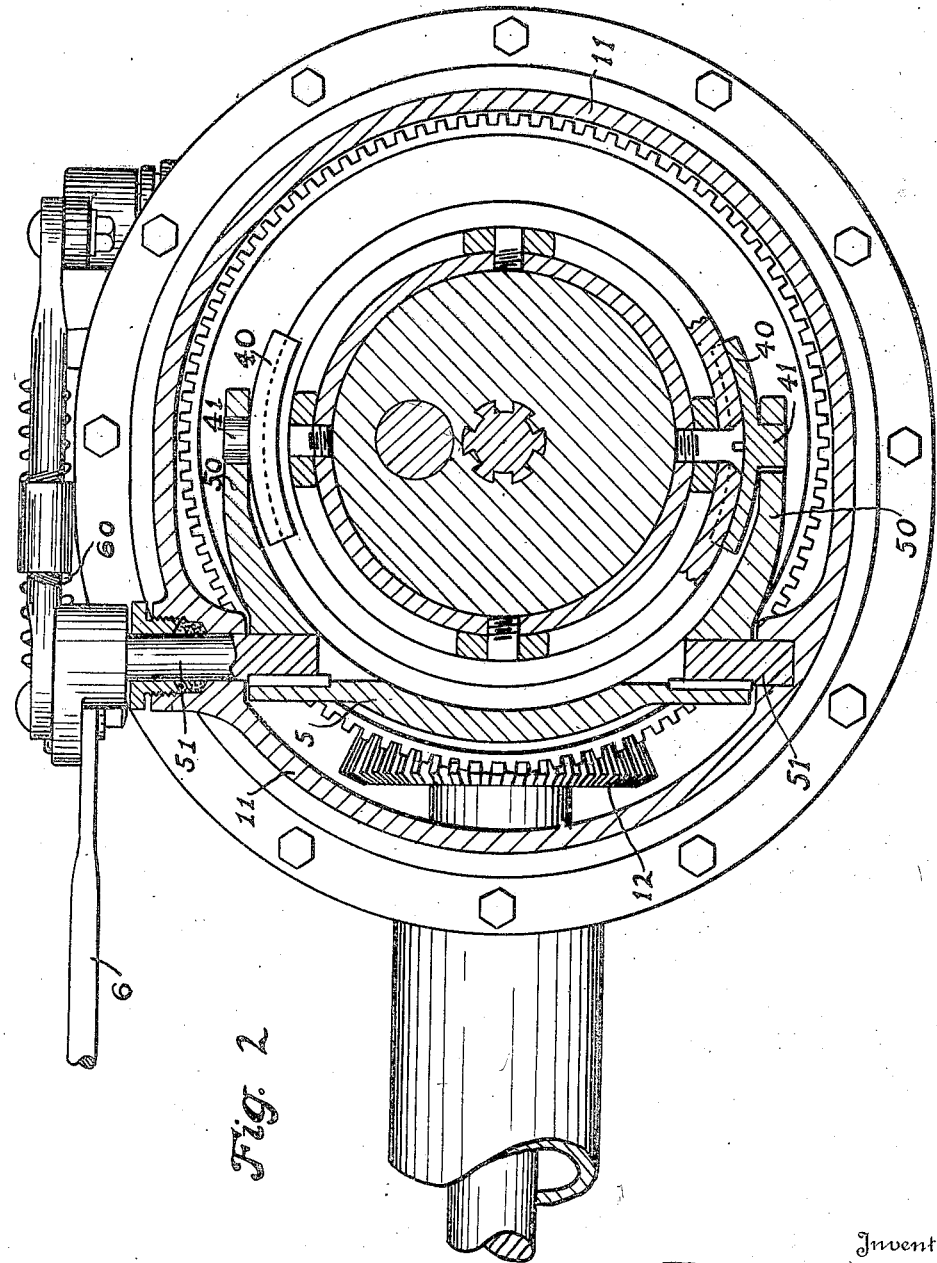

1,437,510

UNITED STATES PATENT OFFICE.

RALPH GERBER, OF RAYMOND, WASHINGTON.

DIFFERENTIAL LOCKING MECHANISM.

Application filed February 23, 1922. Serial No. 538,648.

*To all whom it may concern:*

Be it known that I, RALPH GERBER, a citizen of the United States of America, and resident of the city of Raymond, in the county of Pacific and State of Washington, have invented certain new and useful Improvements in Differential Locking Mechanisms, of which the following is a specification.

My invention relates to differential driving mechanisms and particularly to such mechanisms which have combined therewith means whereby the differential feature may be temporarily eliminated, or in which the differential action may be interfered with in whole or in part, when desired.

The object of my invention is to provide a differential of such character that when a situation arises in which one driving wheel of a car slips around without forward movement of the car, the two wheels may be locked together so as to prevent such spinning of the one wheel. This mechanism I prefer shall include frictional devices such that when desired the resistance to slipping may be applied lightly or more positively, so as to securely lock the two wheels against differential turning.

The features of my invention which I believe to be new and upon which I desire a patent will be hereinafter described and then particularly pointed out in the claims.

The accompanying drawings illustrate my invention and the principles thereof, the construction being that which is now preferred by me.

Figure 1 of the drawings is a section through the differential mechanism, taken upon the plane of the axle.

Figure 2 is a transverse sectional elevation taken through the plane indicated by the broken line 2—2 of Figure 1.

Figure 3 is a top or plan view of the device showing the manner of connecting to the same for controlling its action.

The differential shown herein is of the same type of construction as that shown in Patent No. 1,364,745, issued to me January 4, 1921. This differential is modified to the extent of transforming the cranks of said differential into disks 1. These are secured in a similar manner to the axles 10. Mounted to turn about the inner ends of these axles is a frame 2 which surrounds the two disks 1. This frame is similar in construction to the one shown in said patent and has secured thereto the master gear 20 of the differential mechanism, through which power is applied to turn the axles. This differential mechanism also includes the transversely extending shaft 21 mounted within the frame and the short stub shafts 22 which are journaled in sockets formed within a slide block 23, which latter has both a sliding and a rocking movement upon the shaft 21. The ends of the short stub shafts 22 terminate in globular enlargements 24 which are seated in complemental recesses or sockets carried by the disks 1.

This construction is the same as shown in the said patent excepting that the cranks of said patent are converted into disks. The outer peripheral surface of these disks are utilized as friction surfaces of two clutch mechanisms. The complemental part of each of these clutches is carried upon and turns with the enclosing casing 2. If, therefore, the clutch mechanisms are engaged, each of the disks 1 are so held as to turn with the enclosing cage 2. There can, therefore, be no differential action while they are so held.

The type of clutch mechanisms which is believed to best fit this condition is one in which the friction surfaces are of conical character. I therefore have shown a ring 3 as surrounding each of the disks, the inner surface of the ring and the outer peripheral surface of the disks being correspondingly coned. If these rings be movable in the direction of the axis of the differential, they may be made to engage or disengage with said disks so as to clamp the rings to turn with the disks or to permit free turning of the disks within the rings. There may thus be secured the desired condition of causing the two disks 1 to turn together or to permit differential turning thereof.

The cage 2 is provided with slots 25 extending in a direction parallel with the axis of the differential. Through each of these slots extends a bolt or pin 30 having its inner end fixed to the ring 3. The outer end of this bolt or pin is secured to a ring 4 which extends around the outside of the casing. The number of such pins 30 used to connect the inside and outside rings of the friction device may be made whatever is desired. As shown there are supposed to be four of these for each friction device.

The above friction device is duplicated for each of the disks 1. The shifting of the controlling rings 4 and with them the friction rings 3 is secured by any suitable mechanism. As herein illustrated this mechanism consists of two shoes 40 having flanges which embrace the edges of the ring 4 and axle pin or projection 41, which latter is engaged by the arms 50 of a yoke 5. This yoke is provided with axles or pivot pins 51 at each end which are journaled in suitable bearings in the casing 11 which surrounds the entire mechanism. One of these axles or pivot pins extends through the wall of the casing and on its outer end has secured thereto an arm as 52 by which the yoke may be operated. This arm may be engaged by a rod as 6 through which means the device may be operated from a distance.

The two friction rings 3 may be connected so as to be operated simultaneously and in like manner, by any suitable and convenient means. As herein illustrated the positions of the conical friction surfaces of the two disks are reversed so that the friction rings must be moved in opposite directions when operating, that is, they are moved towards each other to apply friction and away from each other to release the friction. The mechanism just described for operating the friction devices from without the casing has been shown as duplicated for the two friction devices. The two external arms 52 are connected by a link as 53, so as to be operated together. The two yokes are shown as being mounted on respectively opposite sides of the differential device. This has been done to prevent possible interference between the axis of the yoke and the driving pinion 12 of the differential device. The two yokes might, however, be mounted at the same side of the differential except as this might be prevented through such interference as has just been referred to.

It is evident that if the two friction devices be applied at the same time, both of the disks 1 will be secured to the enclosing cage 2 so as to turn therewith. The differential action is thus for the time being eliminated and if one wheel is in soft ground where it spins and the other has a good friction grip, the driving capacity of the one having the friction grip may be utilized.

It is convenient to provide a means whereby these friction devices will automatically be released and normally carried in disengaged position. This may be secured through the use of a spring as 60, which is connected between a support carried by the casing and the yoke operating means. This is under tension in a direction which will act to release the friction device. Through the use of this type of differential, provided with friction locking devices, the differential action of the driving wheels of a car may be done away with temporarily whenever desired.

What I claim as my invention is:

1. The combination with two coaxially positioned revoluble shafts, a disk secured to the adjacent ends of each shaft, a casing enclosing both said disks, a differential driving means carried by said casing and connecting both disks, and means carried by said casing and adapted to frictionally engage said disks to check relative rotation therebetween.

2. The combination with two coaxially positioned revoluble shafts, a disk secured to the adjacent ends of each shaft, a casing enclosing both said disks, a differential driving means carried by said casing and connecting both disks, a ring surrounding each disk, said disks and rings having frictionally engageable coned surfaces, means for supporting said rings from and within the casing for relative axial movement and to prevent relative rotative movement, and means carried by said casing and adapted to frictionally engage said disks to check relative rotation therebetween.

3. The combination with two coaxially positioned revoluble shafts, a disk secured to the adjacent ends of each shaft, a casing enclosing both said disks, a differential driving means carried by said casing and connecting both disks, a friction ring surrounding each disk and having therewith coned friction surfaces, pins extending outward from said rings, the casing having slots passing said pins and permitting relative movement in an axial direction, shifting rings secured to the outer ends of said pins without the casing, shifting shoes engaging said shifting rings and slidable thereon, and means for moving said shoes in axial directions.

4. The combination with two coaxially positioned revoluble shafts, a disk secured to the adjacent ends of each shaft, a casing enclosing both said disks, a differential driving means carried by said casing and connecting both disks, a friction ring surrounding each disk and having therewith coned friction surfaces, pins extending outward from said rings, the casing having slots passing said pins and permitting relative movement in an axial direction, shifting rings secured to the outer ends of said pins without the casing, shifting shoes engaging said shifting rings and slidable thereon, a shifting yoke for each lever, an operating arm for each yoke and a common operating member connected with each of said operating arms.

Signed at Raymond, Pacific County, Washington, this 11 day of February, 1922.

RALPH GERBER.